United States Patent [19]

Katz et al.

[11] 4,170,925
[45] Oct. 16, 1979

[54] BY-PASS VALVE FOR SERVO STEERING SYSTEMS

[75] Inventors: Klaus Katz; Wolfgang Pfundstein; Reinhold Abt, all of Stuttgart, Fed. Rep. of Germany

[73] Assignee: Daimler-Benz AG, Fed. Rep. of Germany

[21] Appl. No.: 784,913

[22] Filed: Apr. 5, 1977

[30] Foreign Application Priority Data

Apr. 8, 1976 [DE] Fed. Rep. of Germany ....... 2615219

[51] Int. Cl.$^2$ .......................... F15B 15/22; F15B 9/10
[52] U.S. Cl. ...................................... 91/400; 91/372; 91/437
[58] Field of Search ................. 91/400, 437, 438, 439; 251/303

[56] References Cited

U.S. PATENT DOCUMENTS

| | | | |
|---|---|---|---|
| 3,252,380 | 5/1966 | Jablonsky et al. | 91/400 |
| 3,549,118 | 12/1970 | Bluder | 251/303 |
| 3,575,001 | 4/1971 | Wilson et al. | 251/303 |
| 3,872,774 | 3/1975 | Forster et al. | 91/400 |
| 3,905,277 | 9/1975 | Rosell | 91/400 |
| 3,924,705 | 12/1975 | Sugisawa | 91/437 |

Primary Examiner—Paul E. Maslousky
Attorney, Agent, or Firm—Craig and Antonelli

[57] ABSTRACT

A by-pass valve for servo-steering systems to turn off the working pressure in a cylinder chamber of a pressure medium cylinder, whose valve housing includes a valve connection adapted to be connected with the cylinder chamber, a valve connection adapted to be essentially pressure-relieved, and a valve seat for a check valve operatively connected between the two valve connections; the valve housing is thereby adjustable relative to the axis of a steering shaft for purposes of changing the position of its valve seat while the closure member of the check valve is thereby retained by springy means in its normal position closing-off the valve connections with respect to one another and is actuatable into its by-pass position connecting the valve connections with each other by way of a stem movable in unison with the closure member by way of a cam surface fixed for movement in unison with the steering shaft; the valve housing is thereby exclusively rotatable in relation to its valve housing axis but is immovably supported in the directions of the valve housing while the valve seat axis does not coincide with the valve housing axis.

29 Claims, 5 Drawing Figures

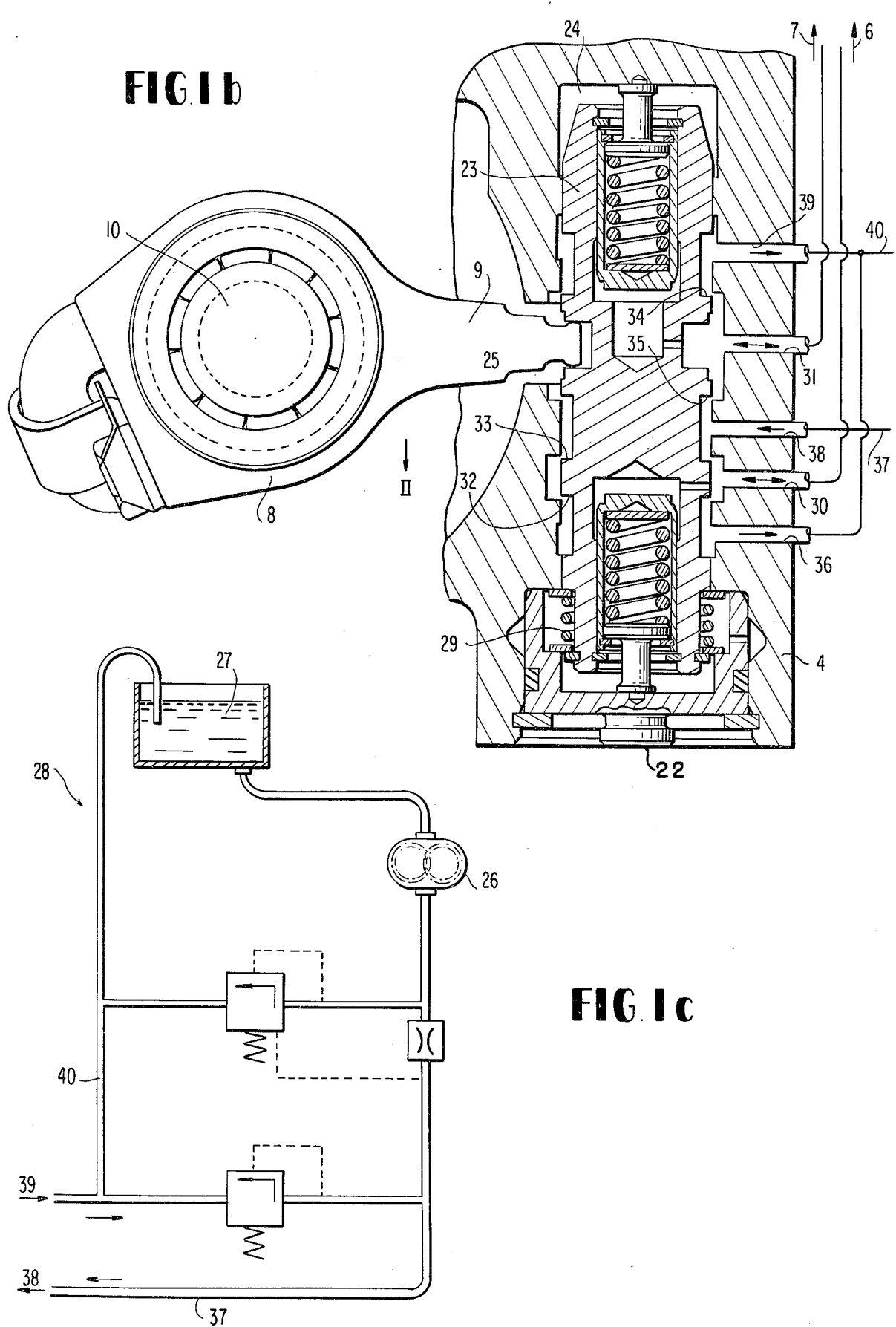

BY-PASS VALVE FOR SERVO STEERING SYSTEMS

The present invention relates to a by-pass or cut-off valve for servo steering systems for cutting off or turning off the working pressure in a cylinder chamber of a pressure medium cylinder, whose valve housing includes a valve connection adapted to be connected with the cylinder chamber, a valve connection adapted to be substantially pressure-relieved, and a valve seat for a check valve operatively connected between the two valve connections and adjustable relative to the axis of a steering shaft for purposes of changing the position of its valve seat, and in which the closure member of the check valve is retained by elastic means in its normal position closing the valve connections with respect to one another and is actuatable into its cut-off or by-pass position connecting with each other the valve connections by way of a stem fixed for movement with the closure member by means of a cam surface fixed for movement in relation to the steering shaft.

In a prior art by-pass valve of this type (German Auslegeschrift No. 1,291,644), the axes of valve housing and valve seat coincide, whereby the valve housing is helically movably supported in the housing of the steering gear in order to enable a change of the distance between the valve seat and the axis of the steering shaft. The shifting pulse for cutting off the working pressure which is triggered or initiated by the steering shaft can be displaced by this change in spacing to any desired location of the piston stroke within the area of the stroke end. In the prior art by-pass valve, the actuating portion of the adjusting screw bolt of the valve housing projects more or less out of the steering gear housing because the valve housing is adjusted in the directions of its longitudinal axis during positional changes relative to the steering shaft axis. This is unfavorable in vehicles because in vehicles very constricted space conditions are the normal rule within the area of the servo steering system and therewith also the accessibility for the corresponding adjusting tools is rendered difficult.

The task underlying the present invention essentially resides in facilitating the adjustment of the distance between the valve seat and the steering shaft axis in a by-pass valve of the aforementioned type.

The underlying problems are solved according to the present invention in an advantageous manner in that the valve housing is supported exclusively rotatably in relation to its valve housing axis but immovably supported in all other directions thereabout the valve housing axis and the valve seat axis does not coincide with the valve housing axis.

In the by-pass valve according to the present invention, the valve housing is fixed with respect to the steering shaft axis at an unchangeable distance. By rotating the valve housing about the valve housing axis, the position of the valve seat changes and therewith the distance of the valve seat relative to the steering shaft axis. As a result thereof, the by-pass valve can be arranged completely recessed in the steering gear housing. Also, the sealing of the valve housing in the steering gear housing is considerably more simple with the by-pass valve according to the present invention than with the prior art by-pass valves since no relative movements occur at the corresponding sealing surfaces in the directions of the valve housing axis. Finally, any adjusting threads are obviated in the by-pass valve according to the present invention, whence also its manufacture becomes more economical.

In the by-pass valve according to the present invention, the valve seat axis and the valve housing axis could be located in separate planes in order to enable the desired change in spacing between the valve seat and the steering shaft axis by rotation of the valve housing. The two axes could thereby be inclined with respect to one another. The arrangement may also be made in such a manner that the valve seat axis and the valve housing axis are disposed parallel to one another.

The prior art by-pass valve is arranged in a housing cover serving the bearing support of a steering shaft end. Its stem is actuated by a cam member threadably secured at the steering shaft end. At least one pressure medium channel extending to the by-pass valve has to extend through the cover separating surface in this arrangement and therefore requires special sealing expenditures, from which also a particularly long channel path additionally results. Finally, the cam member and the structural space required therefor signify a considerably increased structural expenditure.

It frequently proves more advantageous to arrange the by-pass valve in a center area of the steering shaft. The steering gear housing offers thereat more favorable space conditions for the mounting support of the valve housing. In adaptation thereto, provision is made in an advantageous embodiment of the by-pass valve according to the present invention that the valve seat axis and the valve housing axis intersect one another and the valve seat is located eccentrically to the valve housing axis. In this construction, the valve housing axis may be aligned at least approximately parallel to the cylinder axis in adaptation to the cylinder contour of the steering gear housing, which results in a particularly compact type of construction for the steering gear housing.

In the by-pass valve according to the present invention, provision may additionally be made that the valve closure member carries out tilting movement about a valve housing edge between the rest and the by-pass position. This is of advantage in particular when the valve housing axis is located approximately parallel to the cylinder axis. In this case, the stem can be tilted into its by-pass position by a toothed segment of the steering shaft, which is provided customarily in the center shaft section.

In the construction of the by-pass valve according to the present invention as tilting valve, the valve guidance, customary with other types of valves, by means of which a characteristic functional dependence between valve stroke and valve opening cross section is forcibly brought about, can be achieved in a simple manner in that the valve housing and the valve closure member have circularly shaped tilting edges of approximately the same size.

It has also proved as advantageous in the tilting valve construction that a conically shaped valve closure spring is supported with its wide end at the valve housing. As a result thereof, a larger tilting angle enabling a greater freedom of movement as well as a good guide function for the stem are provided thereby.

Finally, also the expenditure of separate cam surfaces at the steering shaft can be avoided in the by-pass valve according to the present invention in that the stem is actuatable directly by a toothed flank of a toothed segment of the steering shaft.

In the application of the present invention to a servo-steering system with one by-pass valve each for the two cylinder chambers separated by a working piston operating in the cylinder, it is advantageous that the by-pass valves are directly connected with a pressure medium connecting line in open communication with one cylinder chamber and are arranged essentially diametrally to the steering shaft, whereby the by-pass valve associated with the other cylinder chamber is located both within the area between the steering shaft and the cylinder end closing off the one cylinder chamber as is also connected with its valve connection adapted to be pressure-relieved with the pressure medium connection. In this manner, the stem will be always within that area, into which the toothed segment enters during the stroke-end of the working piston. The direct actuation of the stem by the toothed segment is facilitated thereby.

The line expenditures for the pressure medium connections of the by-pass valve are kept low in that the other cylinder chamber includes one opening each for the insertion of both valve housings so that both the valve connection associated with the other cylinder chamber of the by-pass valve located between the steering shaft and the cylinder end delimiting the one cylinder chamber as also the valve connection adapted to be pressure-relieved of the other by-pass valve are connected directly to the other cylinder chamber by way of the respective opening.

The enlargement of the outer contour of the steering gear housing customarily including a cylinder bulge for the mounting support of the steering shaft which cannot be avoided by the by-pass valve, can nonetheless be kept small in that the openings are located in the wall of the cylinder bulge.

A section of the pressure medium connection of the by-pass valve which is connected with the one cylinder chamber can be obtained in that the openings are connected with each other by a wall channel of the cylinder bulge.

The other section of this pressure medium connection of the by-pass valves can then be so constructed that the one cylinder chamber is connected with the opening for the by-pass valve of the other cylinder chamber by a wall channel of the cylinder.

Accordingly, it is an object of the present invention to provide a by-pass valve for servo-steering systems which avoids by simple means the aforementioned shortcomings and drawbacks encountered in the prior art.

Another object of the present invention resides in a by-pass valve arrangement for servo-steering installations which is simple in construction, reliable in operation and requires relatively little space.

A further object of the present invention resides in a by-pass valve arrangement for servo-steering systems which is characterized by particularly good accessibility for the adjusting tools.

A still further object of the present invention resides in a by-pass valve for servo-steering systems which facilitates the adjustment of the distance of the valve seat to the steering shaft axis.

Still another object of the present invention resides in a by-pass valve arrangement for steering gear systems, in which the by-pass valves can be arranged completely recessed in the steering gear housing.

A further object of the present invention resides in a servo-steering system in which the sealing problems for the valve housing in the steering gear housing are considerably simplified by the use of a by-pass valve according to the present invention.

Still another object of the present invention resides in a by-pass valve arrangement for a servo-steering system, in which its manufacture can be rendered more economical by the elimination of adjusting threads.

Another object of the present invention resides in a by-pass valve for a servo-steering system which eliminates particularly long channel paths, reduces the structural expenditures, especially for lines, and offers favorable space conditions for the bearing support of the valve housing.

Another object of the present invention resides in a by-pass valve arrangement of the type described above which permits a particularly compact construction of the steering gear housing.

These and other objects, features and advantages of the present invention will become more apparent from the following description when taken in connection with the accompanying drawing which shows, for purposes of illustration only, two embodiments in accordance with the present invention and wherein:

FIG. 1b is a cross-sectional view, on an enlarged scale, through the servo-steering system of FIG. 1a, taken along line Ib—Ib of FIG. 1a;

FIG. 1c is a schematic diagram of the pressure supply of the servo-steering system in accordance with the present invention;

Figure 1A:
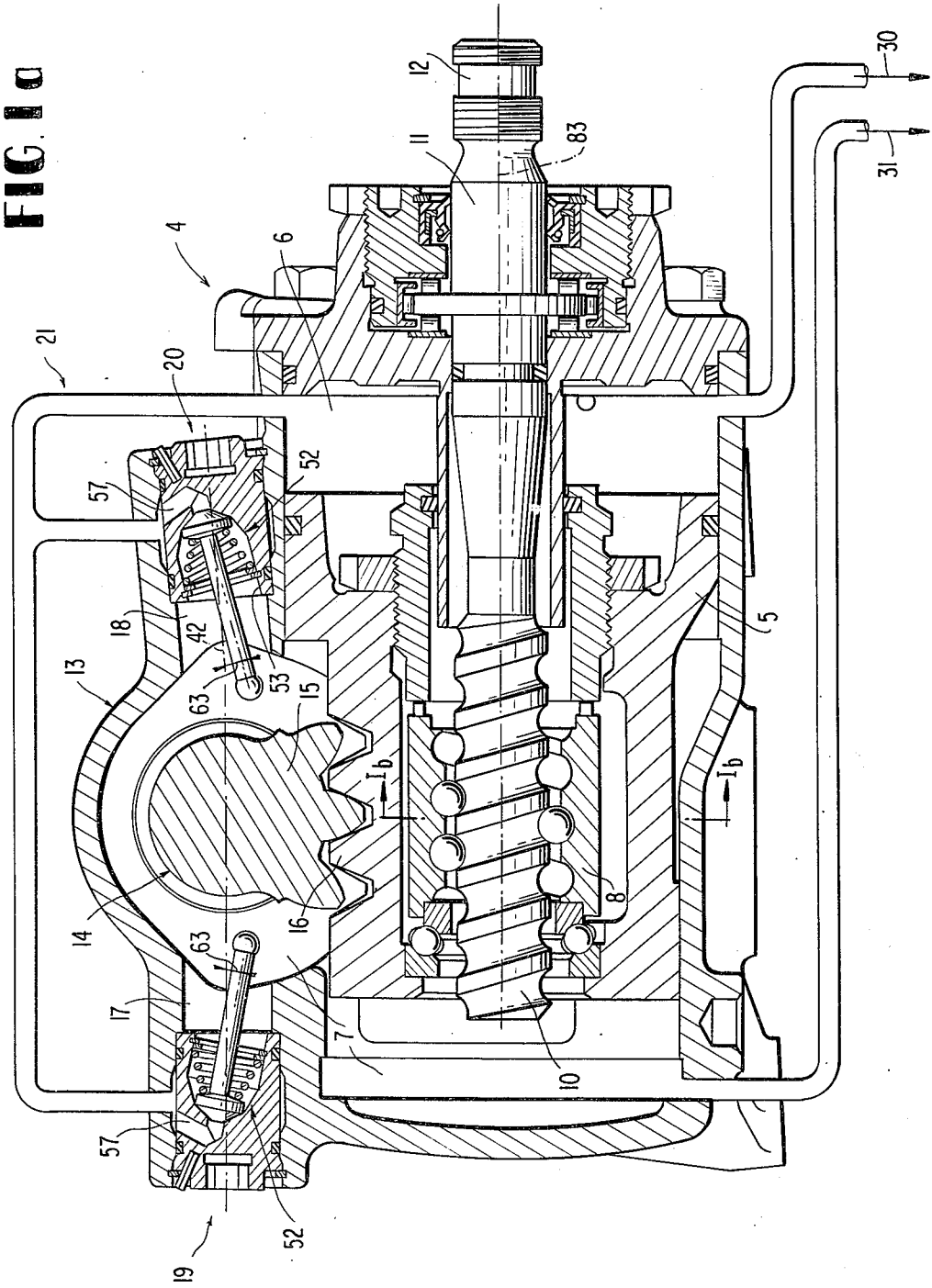
FIG. 1a is a somewhat schematic axial cross-sectional view through a servo-steering system with two by-pass valves according to the present invention taken at right angle to the steering shaft.
Figure 2:
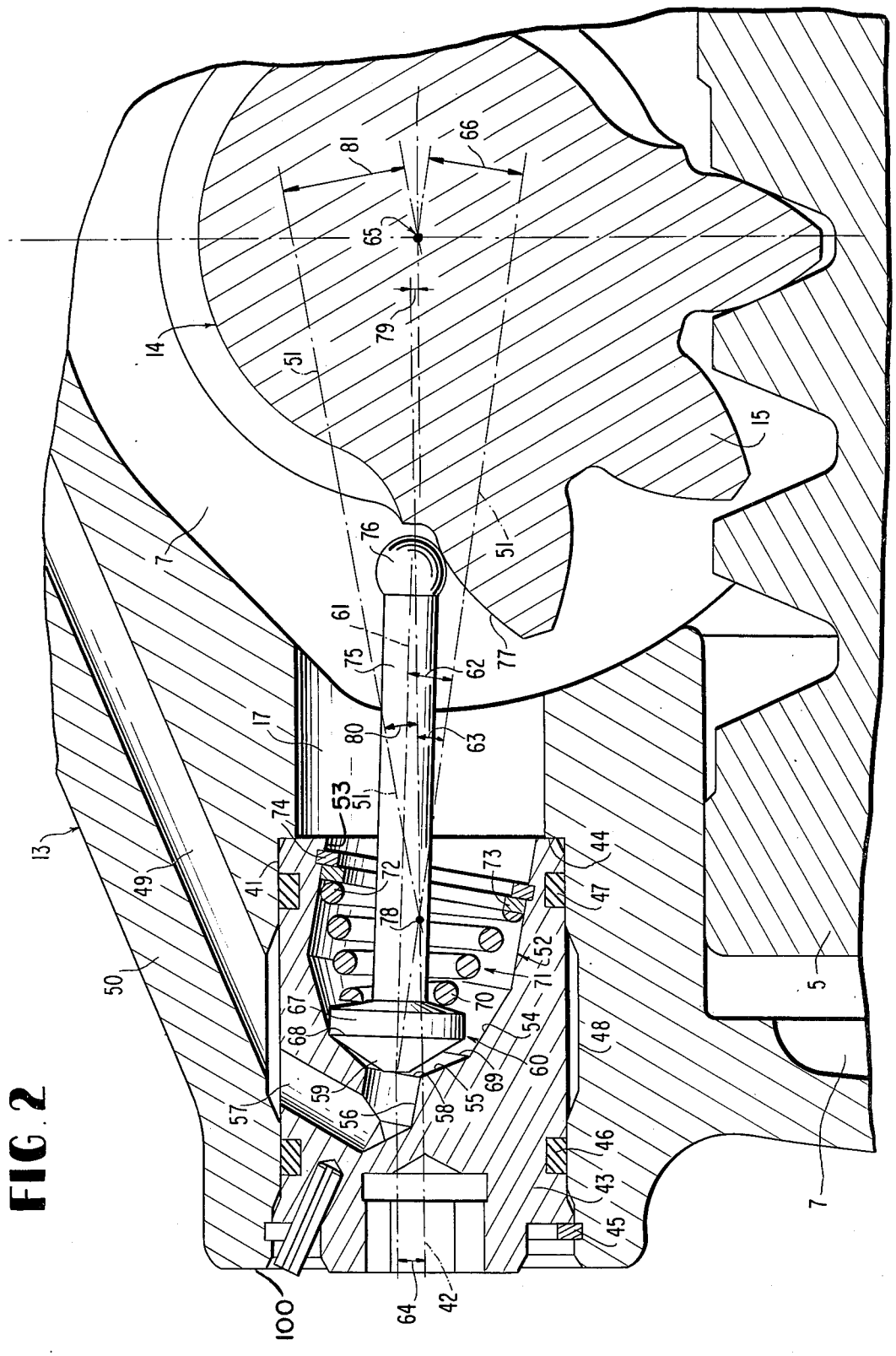
Figure 3:
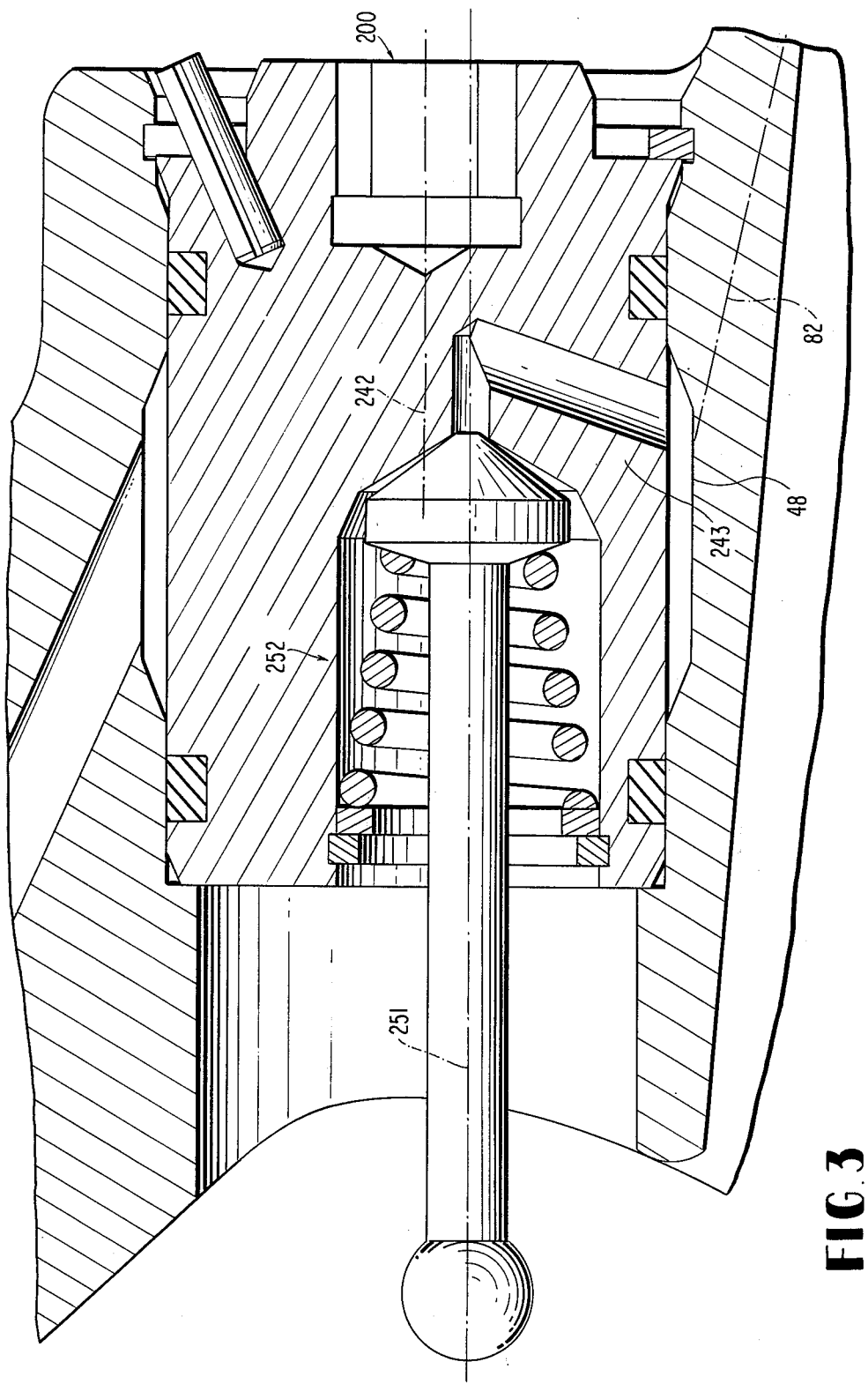

FIG. 2 is a cross-sectional view, on an enlarged scale, through the servo-steering system corresponding to FIG. 1a, in which the by-pass valve according to the present invention is illustrated in its by-pass position; and FIG. 3 is a partial cross-sectional view, similar to FIG. 1a and on an enlarged scale, through the servo-steering system with a modified embodiment of a by-pass valve in accordance with the present invention.

Referring now to the drawing wherein like reference numerals are used throughout the various views to designate like parts, corresponding to the operating diagram a steering gear housing generally designated by reference numeral 4 of the servo-steering system which is constructed as pressure medium cylinder is subdivided by a working piston 5 (FIG. 1a) into two cylinder chambers 6 and 7. The working piston 5 is helically movably connected with a steering worm 10 by means of a steering nut 8 which is rotatable relative thereto but axially immovable with respect thereto and includes a radial steering arm 9 (FIG. 1b). The steering worm 10 is rotatable in the steering gear housing 4 by way of a steering spindle part 11 coaxial thereto and in one piece therewith, but as to the rest is supported essentially immovably. The steering spindle part 11 is adapted to be connected with the steering hand wheel (not shown) by way of its coupling end pin 12 located outside of the steering gear housing 4.

A steering shaft generally designated by reference numeral 14 is rotatably supported in a housing bulge 13 (FIG. 1a and 2) of the steering gear housing 4, which engages in a toothed rod profile 16 of the working piston 5 by means of a toothed segment 15 rotatable in unison with the steering shaft 14.

Two housing openings 17 and 18 of the housing bulge 13 for one by-pass valve each in accordance with the present invention generally designated by reference numerals 19 and 20 are located diametrally to steering shaft 14. The by-pass valves 19 and 20 are operatively connected between a pressure medium connection 21 in free communication with the one cylinder chamber 6, on the one hand, and the other cylinder chamber 7, on the other.

The cylinder chambers 6 and 7 are connected with a continuously feeding pressure pump 26 (FIG. 1c) as well as with a pressure supply system generally designated by reference numeral 28 including a pressure medium tank 27, by way of a control valve generally designated by reference numeral 22 and illustrated in FIG. 1b, whose control slide valve member 23 is displaceably arranged in a dead-end housing bore 24 of the steering gear housing 4 and is actuated by the control arm 9 projecting into the housing dead-end bore 24 by way of a housing opening 25. The pressure medium supply system 28 as well as the pressure medium tank 27 and the pressure pump 26 are illustrated schematically in FIG. 1c. The control slide valve member 23 (FIG. 1b) illustrated in its neutral position for straight drive (in which it is held by a centering spring 29) includes in a conventional manner one pair of control edges each 32, 33 and 34, 35 for a respective valve connection 30 and 31 in communication with a corresponding cylinder chamber 6 and 7. During a left deflection of the steering hand wheel, the control arm 9 is deflected in the direction of arrow II according to FIG. 1b, as a result of which the control edge pair 32, 33 throttles the one communication of the valve connection 30 of the one cylinder chamber 6 with a pressure-relieved valve connection 36, and in contrast thereto, further opens the other communication with a valve connection 38 connected to the feed line 37, while the other control edge pair 34, 35 throttles the one communication of the valve connection 31 of the other cylinder chamber 7 with the valve connection 38 of the feed line 37, and in contrast thereto, further opens the other communication with a further pressure relieved valve connection 39. In this manner, a higher pressure will be established in the cylinder chamber 6 than in the other cylinder chamber 7 so that the piston differential pressure force resulting at the working piston 5 assists the adjustment of the steering shaft 14 initiated by hand. This servo-assist is cut-off or turned-off by the by-pass valve 19, when the working piston 5 is in its stroke end position illustrated in FIG. 2. The by-pass valve 19 thereby operates in such a manner that it now connects the pressure medium line 21 which is now under the higher pressure of the cylinder chamber 6, with the other cylinder chamber 7, which is in a less throttled communication by way of the valve connection 39 with the return line 40 discharging in the pressure medium tank 27 than the cylinder chamber 6. The pressure equalization in the cylinder chambers 6 and 7, effected by the opening of the by-pass valve 19, turns-off or cuts-off the servo-assist by the working piston 5.

During a right deflection of the steering hand wheel, the control slide valve member 23 establishes in a corresponding manner a higher pressure in the other cylinder chamber 7. If the working piston 5 reaches its other stroke end position and therewith the toothed segment 15 reaches the area of the other by-pass valve 20, then the latter opens the pressure medium connection 21 which is now under the lower pressure of the cylinder chamber 6, with respect to the cylinder chamber 7, as a result of which again a pressure equalization occurs and the servo-assist is turned-off.

The by-pass valves 19 and 20 of FIGS. 1a and 2 which are constructed identically, will be described more fully hereinafter by reference to the by-pass valve 19 illustrated in FIG. 2.

A cylindrical valve housing 43 rotatably inserted about its housing axis 42 within an enlarged section 41 of the cylindrical housing opening 17 is immovably fixed in the directions of the axis 42 by a housing abutment 44 and by a snap ring 45. Two annular seals 46 and 47 inserted into circumferential grooves of the valve housing 43 seal off an annular groove 48 in the inner surface of the section 41 of the housing opening 17 with respect to the atmosphere at the cylinder end 100 and with respect to the cylinder chamber 7. A housing channel 49 in the wall 50 of the housing bulge 13, which starts from the annular groove 48, terminates at its other end in the corresponding annular groove of the by-pass valve 20 and thus represents the section of the pressure medium connection 21 in FIG. 1a which connects the by-pass valves 19 and 20.

An aperture or recess 52 of the valve housing 43 which is located concentric to its valve seat axis 51 is so subdivided that a wider cylindrical section 53 which is in open communication with the cylinder chamber 7 passes over by way of an adjoining, relatively acute, conically shaped section 54 into a relatively obtuse section 55 of truncated, conical shape. A narrow, cylindrical section 56 adjoins the obtuse section 55 of the aperture or recess 52, which terminates in a radially extending, channel-like valve connection 57 which is connected by way of the annular groove 48 with the pressure-medium connection 21. The circular edge 58 formed by the sections 55 and 56 cooperates as a valve seat with a conical surface 59 of a valve closure member generally designated by reference numeral 60. The axis of the valve closure member 60 forms in the illustrated by-pass position a tilting angle 62 with respect to the valve seat axis 51 which, in its turn, intersects the valve housing axis 42 at an angle of inclination 63. The valve seat 58 has an eccentricity 64 with respect to the valve housing axis 42 and with respect to the longitudinal axis 65 of the steering shaft 14, a spacing 66 changeable by rotation of the valve housing 43.

The conical surface 59 forms together with the outer surface of an adjoining cylindrical section 67 of the valve closure member 60 a circularly shaped tilting edge 68 whose diameter is only slightly smaller than the diameter of a circular edge 69 operating as corresponding tilting edge on the housing side, which is formed by the stepped arrangement of the housing opening 52 into the conically shaped section section 54 and relatively obtuse section 55. The narrow end 70 of a conical spring 71 engages at the valve closure member 60 whose wide end 72 is supported at a ring-shaped spring plate 73. The spring plate 73, in its turn, abuts at a snap ring 74 inserted into the cylindrical section 53 of the housing opening 52.

The valve closure member 60 is additionally provided with a coaxial stem 75 fixed relative thereto, which extends through the conical spring 71 and carries at its free end a spherically-shaped engaging member 76 which cooperates in the stroke end position with a tooth flank 77 that acts as a cam surface of the toothed segment 15 in order to bring the valve closure member 60 into its by-pass position, in which it is opened and thereby cuts-off the servo-assist by allowing a pressure equalization between chambers 6 and 7. The valve closure member 60 with its fixed coaxial stem 75 and its engaging member 76 form a check valve operatively connected between the first valve connection 57 and the second valve connection 52 which is essentially pressure-relievable.

During the rotation of the valve housing 43 about its axis 42, the valve seat axis 51 forms the generatrix of the outer surface of a double cone of rotation, whose center lies at the point of intersection 78 of the valve housing axis 42 and of the valve seat axis 51. If the rotation amounts exactly to an angle of 90°, then the eccentricity 64 and the angle of inclination 63 become zero in the plane of projection of FIG. 2 whereas the distance 66 becomes equal to the design spacing 79 of the valve housing axis 42 and the steering shaft axis 65. If one increases the angle of rotation to 180°, then the valve seat axis 51 reaches the position indicated by the angle 80 in dash and dot lines, in which it has a spacing 81 with respect to the steering shaft axis 65. In the normal, closed position of the by-pass valve 17 (illustrated in FIG. 1a), the valve seat axis 51 and the valve closure member axis 61 coincide. It follows therefrom that with a rotation of the valve housing 43—independent of the direction of rotation—the tooth flank 77 comes into engagement with the engaging member 76 the later, the greater the angle of rotation of the valve housing 43 with respect to the position illustrated in FIGS. 1a and 2. This means, the initiation of the by-pass pulse will be displaced in the direction toward the stroke-end of the working piston 5.

In the by-pass valve 19, the first valve connection 57 is coordinated to the cylinder chamber 6 (by way of the pressure medium connection 21), whereas the section 53 of the aperture or recess 52 which during the turning-off is subjected to the lower pressure of the cylinder chamber 7, operates as an essentially pressure-relievable second valve connection.

In contradistinction thereto, in the by-pass valve 20, the cylindrical section 53 of the aperture or recess 52 (FIG. 1a) is coordinated as valve connection directly to the cylinder chamber 7 subjected to the higher pressure during the cutting-off (by way of the housing opening 18), whereas the valve connection 57 of this by-pass valve 20, which is under the lower pressure of the cylinder chamber 6 (by way of the pressure medium connection 21), operates as essentially pressure-relievable valve connection.

The by-pass valve 200 illustrated in FIG. 3 differs from the by-pass valve 20 essentially in that the valve housing axis 242 and the valve seat axis 251 are parallel to one another, as a result of which the valve seat axis 251 forms the generatrix of the outer surface of a cylinder of revolution during the rotation of the valve housing 243.

In contradistinction thereto, its annular groove 48 as well as that of the by-pass valve 20 can be connected with the cylinder chamber 6 by way of a cross channel 82 which is indicated in FIG. 3 only as a dot and dash line and extends, for example, as a bore, through the valve housing.

Finally, the valve housing axis 42 (FIG. 2) of the by-pass valve 19 is aligned essentially parallel to the piston axis 83 (FIG. 1) of the working piston 5 whereas the valve housing axes 42 and 242 by reason of the larger diameter of the cylinder chamber 6 with respect to the cylinder chamber 7 are inclined slightly to the piston axis 83, whence the by-pass valves can be incorporated optimally into the outer contour of the servo-steering system.

While we have shown and described two embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A by-pass valve means in a servo-steering system, for cutting out working pressure, which by-pass valve means comprises:
   a valve housing means including first valve-connection means,
   second valve-connection means adapted to be essentially pressure-relieved, and
   a valve seat means for a check valve means operatively connected between said first and second valve-connection means,
   said check valve means including a closure member held in a normal position in which it closes off the first and second valve-connection means with respect to one another by spring means, and
   said check valve means including its closure member further being operable to be actuated into a by-pass position in which it operatively connects the first and second valve-connection means with each other,
   wherein the valve housing means, when in a completely assembled and operating condition, is exclusively movable in the rotational direction about a longitudinal axis of the valve housing means but is substantially immovably supported in all other directions thereabout the valve housing longitudinal axis,
   wherein a longitudinal axis of the valve seat means is adjustable relative to a longitudinal axis of a steering shaft, and
   wherein the valve seat longitudinal axis is non-coincidental but non-perpendicular with the valve housing longitudinal axis.

2. A by-pass valve according to claim 1, characterized in that the closure member of the check-valve means is actuated nto its by-pass position by a cam surface means fixed for movement with the steering shaft by way of an engaging member fixed for movement with the closure member.

3. A by-pass valve according to claim 1, characterized in that the valve seat axis and the valve housing axis are located in different planes.

4. A by-pass valve according to claim 3, characterized in that the valve seat axis and the valve housing axis are parallel to one another.

5. A by-pass valve according to claim 1, characterized in that the valve seat axis and the valve housing axis intersect one another and further in that the valve seat axis is located eccentrically to the valve housing axis.

6. A by-pass valve for a servo-steering system for cutting out the working pressure in a cylinder chamber means of a pressure-medium cylinder means, which comprises a valve housing means including first valve-connection means adapted to be connected with the cylinder chamber means, second valve-connection means adapted to be essentially pressure-relieved, and a valve seat means for a check valve means operatively connected between the two valve-connection means, said valve housing means being adjustable relative to an axis of a steering shaft for purposes of changing the valve seat means, said check valve means including a closure member held in a normal position in which it closes off the first and second valve-connection means with respect to one another by elastic means and being operable to be actuated into a by-pass position in which it operatively connects the first and second valve-connection means with each other, characterized in that the valve housing means, when in a completely assembled and operating condition, is exclusively rotatable about the valve housing means longitudinal axis but is substantially immovably supported in all other directions about the valve housing means londitudinal axis, and in that the valve seat means longitudinal axis is noncoincidental but non-perpendicular with the valve housing means longitudinal axis, and in that the closure member of the check valve means carries out tilting movements about a tilting edge of the valve seat means so that the check valve means is brought into and out of its normal and by-pass positions.

7. A by-pass valve according to claim 6, characterized in that the valve seat means and the valve closure member have circularly shaped tilting edges of approximately the same size.

8. A by-pass valve according to claim 6, characterized in that the elastic means is a conically shaped valve closure spring that supports the valve closure member and is itself supported with its wider end at the valve housing means.

9. A by-pass valve according to claim 2, characterized in that the the cam surface means is a toothed flank of a toothed segment of the steering shaft.

10. A servo-steering system with two by-pass valve means, one for each of two cylinder chamber means subdivided by a working piston means operating in the two cylinder chamber means, characterized in that each of said two by-pass valve means is connected with a pressure-medium connection in substantially open communication with one of said two cylinder chamber means, said two by-pass valve means are arranged substantially diametrally so that one of the said two by-pass valve means is on one side and the other is on the opposite side of a steering shaft, one of the said two by-pass valve means being coordinated to the other cylinder chamber means and being located within an area between the steering shaft and a cylinder end closing off said other cylinder chamber means from the atmosphere, said one of the said two by-pass valve means further having a first valve connection means being operatively connected with the pressure-medium connection, said cylinder end includes one housing opening means for the insertion of one of two valve housing means, said one of the two valve housing means being so arranged that the first valve connection means and a second valve connection means, are both connected to the one cylinder chamber means by way of the pressure medium connection, a valve seat means for a check valve means operatively connected between said first and second valve connection means, wherein the valve housing means, when in a completely assembled and operating condition, is exclusively movable in the rotational direction about a longitudinal axis of the valve housing means, and wherein a valve seat longitudinal axis is non-coincidental but non-perpendicular with the valve housing longitudinal axis.

11. A servo-steering system according to claim 10, characterized in that a cylinder bulge means for the support of the steering shaft has the two housing opening means located in opposite sidewalls of the cylinder bulge.

12. A servo-steering system according to claim 11, characterized in that the two housing opening means are connected with each other by a housing channel in said cylinder bulge means.

13. A servo-steering system according to claim 11, characterized in that the one cylinder chamber means is connected with the housing opening means for the by-pass valve means of the other cylinder chamber means by way of the pressure medium connection.

14. A servo-steering system according to claim 13, characterized in that the housing channel is also located in a steering gear housing means.

15. A servo-steering system according to claim 10, characterized in that a closure member of a check-valve means in each of the by-pass valve means is actuated into a by-pass position by a cam surface means fixed for movement with the steering shaft by way of an engaging member fixed for movement with the closure member.

16. A servo-steering system according to claim 15, characterized in that the the cam surface means is a toothed flank of a toothed segment of the steering shaft.

17. A servo-steering system according to claim 16, characterized in that the closure member of the check valve means carries out tilting movements about a tilting edge of the valve seat means so that the check valve means is brought into and out of a normal position and the by-pass position.

18. A servo-steering system according to claim 17, characterized in that the valve housing means and the closure member have circularly shaped tilting edges of approximately the same size.

19. A servo-steering system according to claim 16, characterized in that a conically shaped valve closure spring supports the closure member and is itself supported with its wider end at the valve housing means.

20. A servo-steering system according to claim 16, characterized in that the valve seat longitudinal axis and the valve housing longitudinal axis are located in different planes.

21. A servo-steering system according to claim 20, characterized in that the valve seat longitudinal axis and the valve housing longitudinal axis are parallel to one another.

22. A servo-steering system according to claim 16, characterized in that the valve seat longitudinal axis and the valve housing longitudinal axis intersect one another and further in that the valve seat longitudinal axis is located eccentrically to the valve housing longitudinal axis.

23. A servo-steering system according to claim 16, characterized in that the housing opening means are connected with each other by a housing channel in a cylinder bulge means for support of the steering shaft.

24. A servo-steering system according to claim 16, characterized in that the one cylinder chamber means is connected with the housing opening means for the by-pass valve means of the other cylinder chamber means by way of the pressure medium connection, 25. A servo-steering system according to claim 24, characterized in that the housing channel is also located in a steering gear housing means.

26. A by-pass valve means in a servo-steering system, for cutting out working pressure, said by-pass valve means comprising:
   a. a valve housing means, when in a completely assembled and operating condition being exclusively movable in the rotational direction about a longitudinal axis and being substantially immovably supported in all other directions thereabout;
   b. first valve-connection means connected at one end of said valve housing means;
   c. second valve-connection means connected at another end of said valve housing means;
   d. a valve seat means being disposed in said valve housing means and having a longitudinal axis non-coincidental but non-perpendicular with the longitudinal axis of said valve housing means;
   e. a check valve means, adapted to be seated in said valve seat means, for the cutting out of the working pressure between said first and second valve-connection means; and
   wherein, upon the movement of the valve housing means in the rotational direction about its longitudinal axis, the longitudinal axis of the valve seat means is adjusted relative to a longitudinal axis of a steering shaft.

27. A by-pass valve according to claim 1, characterized in that said spring means is a conically shaped valve closure spring which supports the closure member and which is itself supported with its wider end at the valve housing means.

28. A servo-steering system, according to claim 10, further comprising first annular groove means, arranged in the one housing opening means, for directly connecting said one of said two by-pass valve means with the pressure-medium connection.

29. A servo-steering system, according to claim 10, further comprising second annular groove means, arranged in another housing opening means, for connecting another of the two by-pass valve means with the pressure-medium connection.

* * * * *